United States Patent
Bosley

(10) Patent No.: US 7,676,282 B2
(45) Date of Patent: Mar. 9, 2010

(54) COMPRESSION OF SERVO CONTROL LOGGING ENTRIES

(75) Inventor: Jonathan E Bosley, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 1060 days.

(21) Appl. No.: 11/293,597

(22) Filed: Dec. 2, 2005

(65) Prior Publication Data

US 2007/0130099 A1 Jun. 7, 2007

(51) Int. Cl.
 *G05B 11/01* (2006.01)
 *G06F 17/40* (2006.01)
(52) U.S. Cl. .................... 700/24; 702/187; 318/560
(58) Field of Classification Search ............ 700/24, 700/27, 28; 707/1, 200; 360/75, 77.05; 318/560; 702/187
See application file for complete search history.

(56) References Cited

U.S. PATENT DOCUMENTS

| | | | |
|---|---|---|---|
| 4,679,103 A | 7/1987 | Workman | |
| 4,918,972 A | 4/1990 | Kenny et al. | |
| 5,539,452 A * | 7/1996 | Bush et al. | 348/14.13 |
| 6,078,453 A | 6/2000 | Dziallo et al. | |
| 6,268,972 B1 | 7/2001 | Philpott et al. | |
| 6,344,942 B1 | 2/2002 | Yarmchuk | |
| 6,369,971 B1 | 4/2002 | Everett | |
| 6,574,068 B1 | 6/2003 | Hampshire | |
| 6,608,731 B2 | 8/2003 | Szita | |
| 6,791,781 B2 * | 9/2004 | Bui et al. | 360/72.2 |
| 7,286,319 B2 * | 10/2007 | Kida et al. | 360/78.14 |
| 2002/0067567 A1 * | 6/2002 | Szita | 360/77.04 |

OTHER PUBLICATIONS

Bipes (1996) IBM Technical Disclosure Bulletin 39-397.

* cited by examiner

*Primary Examiner*—Charles R Kasenge
(74) *Attorney, Agent, or Firm*—Dan Shifrin

(57) ABSTRACT

In controlled mechanical hardware, such as servo-controlled hardware, data from the control algorithm is obtained and logged for possible later analysis. Loss-less compression is provided without increasing the size of the storage memory. Instead of continuously storing the complete (absolute) value of a monitored control parameter, an absolute value is stored in an absolute entry and one or more values of the parameter which are relative to each preceding value are stored in a sequence of associated relative entries. The space required to store a relative value is less than the space required to store an absolute value. Updated absolute values and groups of associated relative values may also be recorded periodically or when a relative value is too large for the allotted space. The size of relative values may be variable and appropriate information data entries may be generated to indicate the size of associated relative entries.

35 Claims, 6 Drawing Sheets

Relative Entry level 2 (Entry Type 0x03)

| Bits | 0-1 | 2-10 | 11-24 | 25-38 | 39-47 |
|---|---|---|---|---|---|
| Meaning | Entry Type | Relative Position | Relative Desired Velocity | Relative Actual Velocity | Absolute Torque |

Absolute Entry (Entry Type 0x1)

| Bits | 0-1 | 2-17 | 18-39 | 40-61 | 62-70 |
|---|---|---|---|---|---|
| Meaning | Entry Type | Absolute Position | Absolute Desired Velocity | Absolute Actual Velocity | Absolute Torque |

Fig. 7

Relative Entry level 2 (Entry Type 0x03)

| Bits | 0-1 | 2-10 | 11-24 | 25-38 | 39-47 |
|---|---|---|---|---|---|
| Meaning | Entry Type | Relative Position | Relative Desired Velocity | Relative Actual Velocity | Absolute Torque |

Fig. 8

Relative Entry Level 1 (Entry Type 0x02)

| Bits | 0-1 | 2-9 | 10-22 | 23-31 |
|---|---|---|---|---|
| Meaning | Entry Type | Relative Position | Relative Actual Velocity | Absolute Torque |

Fig. 9

Relative Definition Informational Entry (Entry Type 0x0, Information Type 0x0)

| Bits | 0-1 | 2-3 | 4-7 | 8-11 | 12-15 |
|---|---|---|---|---|---|
| Meaning | Entry Type | Information Type | # of Bits Position | # of Bits Desired Velocity | #of Bits Actual Velocity |

Fig. 10

Relative Definition Informational Entry (Entry Type 0x0, Information Type 0x0)

| | | | Relative Level 1 | | | Relative Level 2 | | | |
|---|---|---|---|---|---|---|---|---|---|
| Bits | 0-1 | 2-3 | 4-7 | 8-11 | 12-15 | 16-19 | 20-23 | 24-27 | 28-31 |
| Meaning | Entry Type | Information Type | # of Bits Position | #of Bits Desired Velocity | # of Bits Actual Velocity | # of Bits Position | # of Bits Desired Velocity | # of Bits Actual Velocity | Unused |

Fig. 11

COMPRESSION OF SERVO CONTROL LOGGING ENTRIES

TECHNICAL FIELD

The present invention relates generally to logging data from controlled mechanical hardware and, in particular, to compressing logged servo data in a loss-less manner.

BACKGROUND ART

In many servo controlled mechanical applications, such as controlling a magnetic tape storage drive or an accessor and gripper in an automated data storage library, it may be important to log data from servo control algorithms. Such logged data may then be used to determine if the algorithms are effective and efficient or require tuning. The logged data may also be used to debug problems which occur within a servo control system and/or in the associated hardware. Logged data may be used both during the development phase of a product and during the everyday operation of the product in the field.

It will be appreciated that logged data requires memory space. Typically, when the memory has become full, existing data is overwritten by new data on a first-in-first-out basis and is lost. The amount of memory available, therefore, places a limit on the amount of data which can be stored. Expanding the memory is theoretically possible and allows for more data to be available for later analysis, but this can be costly and may take memory away from some other aspect of the system. When logged data is stored in memory on a servo control card, one or more additional cards may be used for provide additional storage. However, it then becomes necessary to provide a communications link among the cards which may create a bandwidth issue.

In another method, servo data is logged less frequently, such as every four times through the servo loop instead of every time. Alternatively, some of the servo parameters are logged during each loop with the remaining parameters logged during one or more subsequent loops. A significant disadvantage of these methods is that the logged data is incomplete and can be considered to be forms of "lossy" compression.

Conventional compression methods may also be applied to logged servo data, such as with the popular ZIP algorithm. However, applying compression algorithms is a processor-intensive procedure and may absorb significant processing cycles which are needed for other uses. For example, some magnetic tape drives, such as LTO drives, include a dedicated data compression chip to compress incoming user data before it is written to the tape. A dedicated compression chip could be used to compress servo data before writing it to memory, but this adds cost.

Consequently, a need remains for the ability to log data from controlled mechanical hardware in a loss-less manner without requiring significant processor time.

SUMMARY OF THE INVENTION

In controlled mechanical hardware, such as servo-controlled hardware, data from the control algorithm is obtained and logged for possible later analysis. The present invention provides loss-less compression without increasing the size of the storage memory. Instead of continuously storing the complete (absolute) value of a monitored control parameter, an absolute value is stored in an absolute entry and one or more values of the parameter which are relative to each preceding value are stored in a sequence of associated relative entries. The space required to store a relative value is less than the space required to store an absolute value, as the relative value is the difference between the current absolute value and the previous absolute value. Updated absolute values and groups of associated relative values may also be recorded periodically or when a relative value is too large for the allotted space. The size of relative values may be variable and appropriate information data entries may be generated to indicate the size of associated relative entries. A relative value of a parameter may be obtained by reading a current value and subtracting from it the previous value of the parameter. When decoding the relative entries during later analysis, the absolute value of a particular parameter at a particular entry may be obtained by finding the most recently logged absolute value and then adding the values of all relative entries for that parameter between the absolute entry and the desired relative entry.

BRIEF DESCRIPTION OF THE DRAWINGS

FIG. 7 illustrates an example of an absolute entry data structure;

FIG. 8 illustrates one example of a relative entry data structure;

FIG. 9 illustrates a second example of a relative entry data structure;

FIG. 10 illustrates one example of an informational entry data structure; and

FIG. 11 illustrates a second example of an informational entry data structure.

DETAILED DESCRIPTION OF THE PREFERRED EMBODIMENT

This invention is described in preferred embodiments in the following description with reference to the Figures, in which like numerals represent the same or similar elements. While this invention is described in terms of the best mode for achieving this invention's objectives, it will be appreciated by those skilled in the art that it is intended to cover alternatives, modifications, and equivalents as may be included within the spirit and scope of the invention as defined by the appended claims.

Moreover, the present invention will be described as embodied in an automated magnetic tape library storage system for use in a data processing environment. However, one skilled in the art will recognize the invention equally applies to other mechanical control systems. Thus, the description herein of an automated magnetic tape storage system is by way of example and is not meant to limit the scope of the invention in any way.

Automated data storage libraries are known for providing cost effective storage and retrieval of large quantities of data. The data in automated data storage libraries is stored on data storage media that are, in turn, stored on storage cells, shelves or the like inside the library in a fashion that renders the media, and its resident data, accessible for physical retrieval. Such media is commonly termed "removable media". Data storage media may comprise any type of media on which data may be stored and which may serve as removable media, including but not limited to magnetic media (such as magnetic tape or disks), optical media (such as optical tape or disks), electronic media (such as PROM, EEPROM, flash PROM, Compactflash™, Smartmedia™, Memory Stick™, etc.), or other suitable media. Typically, the data stored in automated data storage libraries is resident on data storage media that is contained within a data storage cartridge, also referred to as a cartridge. An example of a data storage cartridge that is widely employed in automated data storage libraries for mass data storage is a magnetic tape cartridge.

In addition to data storage media, automated data storage libraries typically contain one or more data storage drives that store (write) data to and/or retrieve (read) data from the data storage media. Transport of cartridges between storage cells and storage drives is typically accomplished by one or more robot accessors. Such accessors have grippers for physically retrieving a selected cartridge from a storage cell within the library and transporting the cartridge to a storage drive by moving in the X and/or Y directions.

Figure 1:
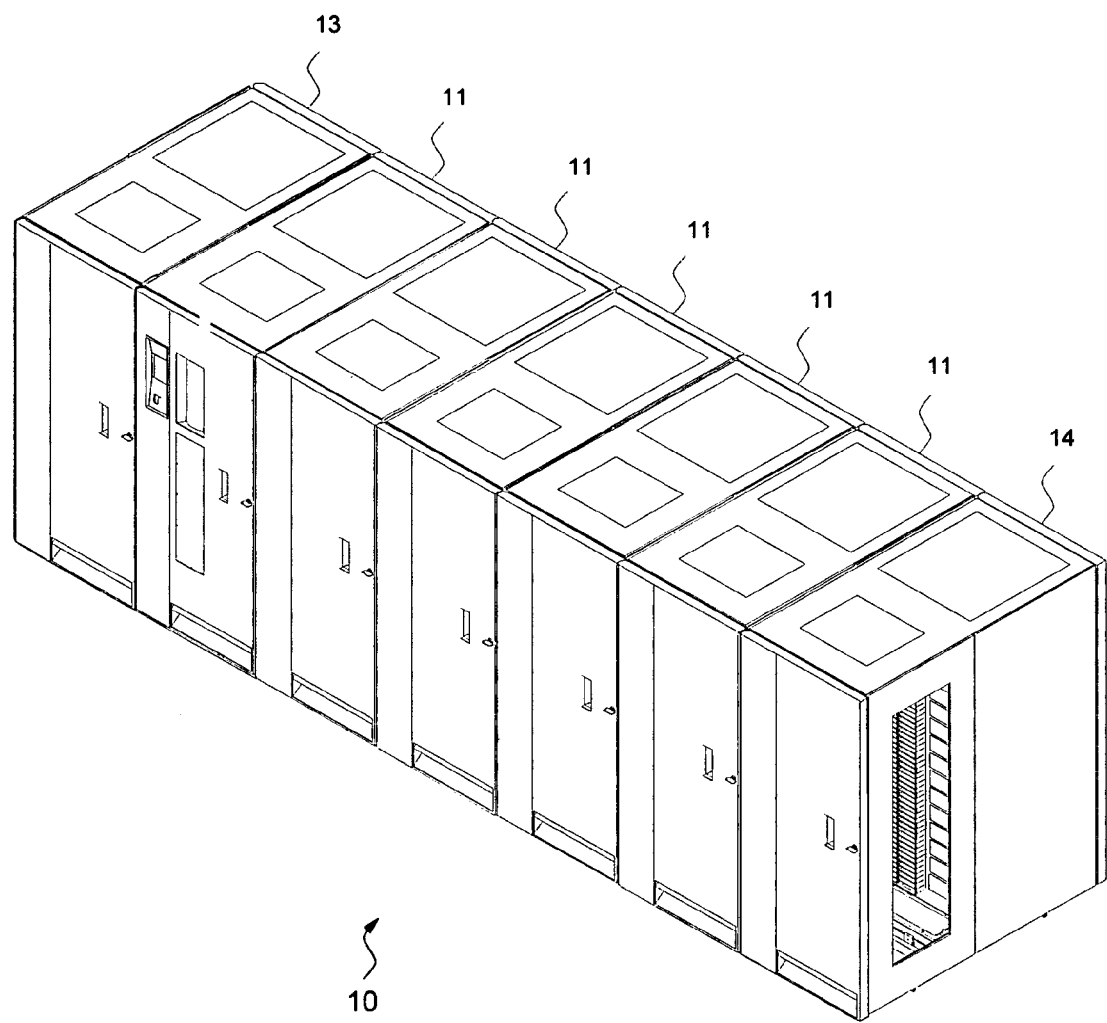
FIG. 1 is an isometric view of an automated data storage library in which the present invention may be implemented.
Figure 2:
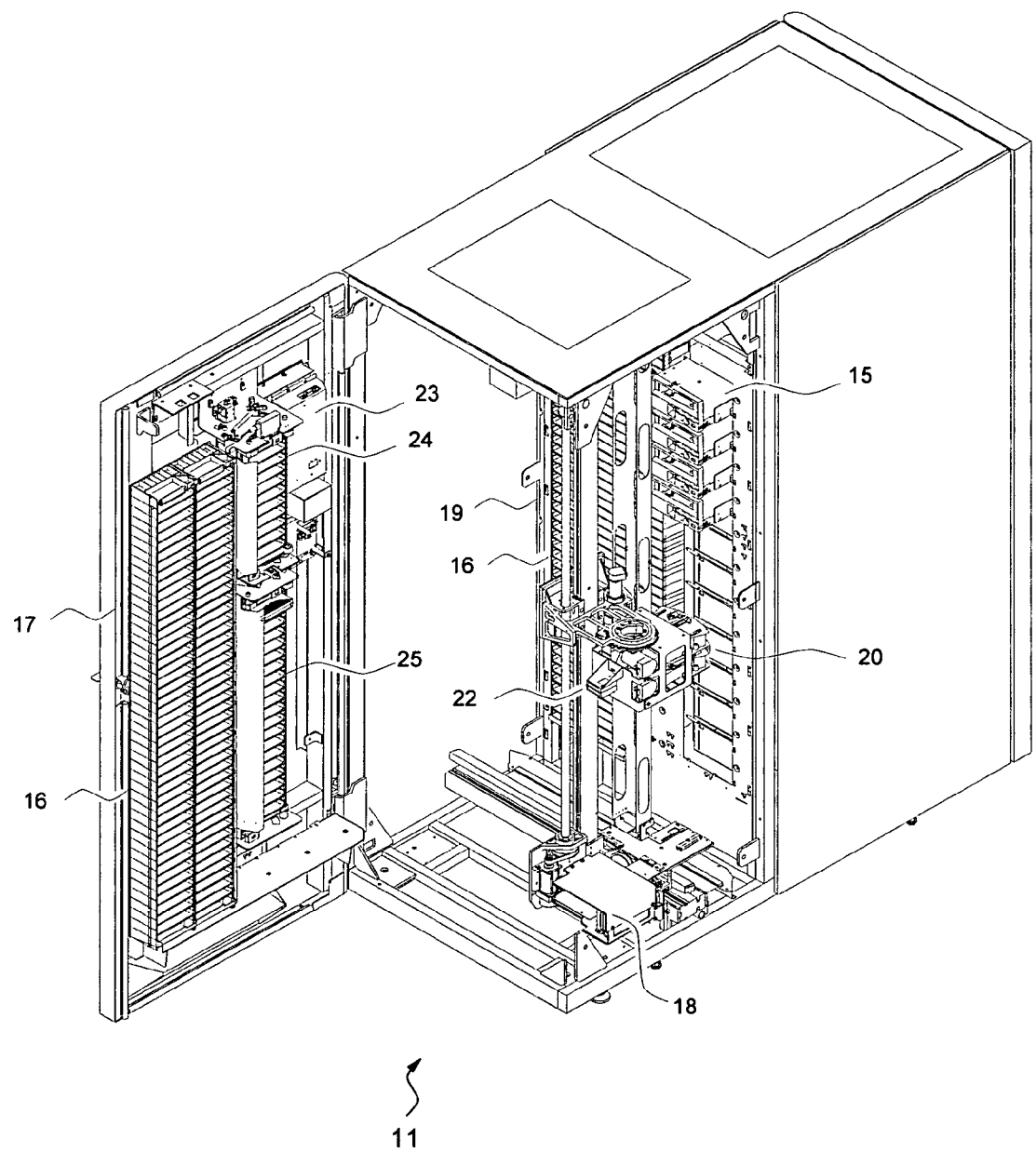
FIG. 2 is an isometric view of one frame of the automated data storage library of FIG. 1, with a front panel opened.

FIGS. 1 and 2 illustrate an automated data storage library 10 in which data storage cartridges containing data storage media (not shown) are stored in and retrieved from storage cells or shelves 16. It is noted that references to "data storage media" herein also refer to data storage cartridges, and for purposes herein the two terms are used synonymously. An example of an automated data storage library which may implement the present invention, and has a configuration as depicted in FIGS. 1 and 2, is the IBM 3584 UltraScalable Tape Library. The library 10 illustrated in FIG. 1 comprises a left hand service bay 13, one or more storage frames 11A-11E (referred to herein generically as storage frame 11) and a right hand service bay 14. A frame may comprise an expansion component of the library. Frames may be added or removed to expand or reduce the size and/or functionality of the library. Frames may comprise additional storage cells, drives, import/export stations, accessors, operator panels, etc.

FIG. 2 shows an example of a storage frame 11, which is the base frame of the library 10 and is contemplated to be the minimum configuration of the library. In this minimum configuration, there is only a single accessor (i.e., there are no redundant accessors) and there is no service bay. The library 10 is arranged for accessing data storage media in response to commands from at least one external host system (not shown), and comprises a plurality of storage cells 16 on a front wall 17 and a rear wall 19 for storing data cartridges that contain data storage media; at least one data storage drive 15 for reading and/or writing data from/to the data storage media; and a first accessor 18 for transporting the data storage media between the plurality of storage cells 16 and the data storage drive(s) 15. The data storage drives 15 may be optical disk drives or magnetic tape drives, or other types of data storage drives as are used to read and/or write data from/to the data storage media. The storage frame 11 may optionally comprise an operator panel 23 or other user interface, such as a web-based interface, which allows a user to interact with the library. The storage frame 11 may further optionally comprise an upper I/O station 24 and/or a lower I/O station 25 which allow data storage cartridges to be inserted into the library and/or removed from the library without disrupting library operations. The library 10 may comprise one or more storage frames 11, each having storage cells 16 accessible by first accessor 18.

As described above, the storage frames 11 may be configured with different components depending upon the intended function. One configuration of storage frame 11 may comprise storage cells 16, data storage drive(s) 15, and other optional components to store and retrieve data from the data storage cartridges. The first accessor 18 comprises a gripper assembly 20 for gripping one or more data storage media and may include a bar code scanner 22 or other reading system, such as a cartridge memory reader or similar system, mounted on the gripper 20, to "read" identifying information about the data storage media.

Figure 3:
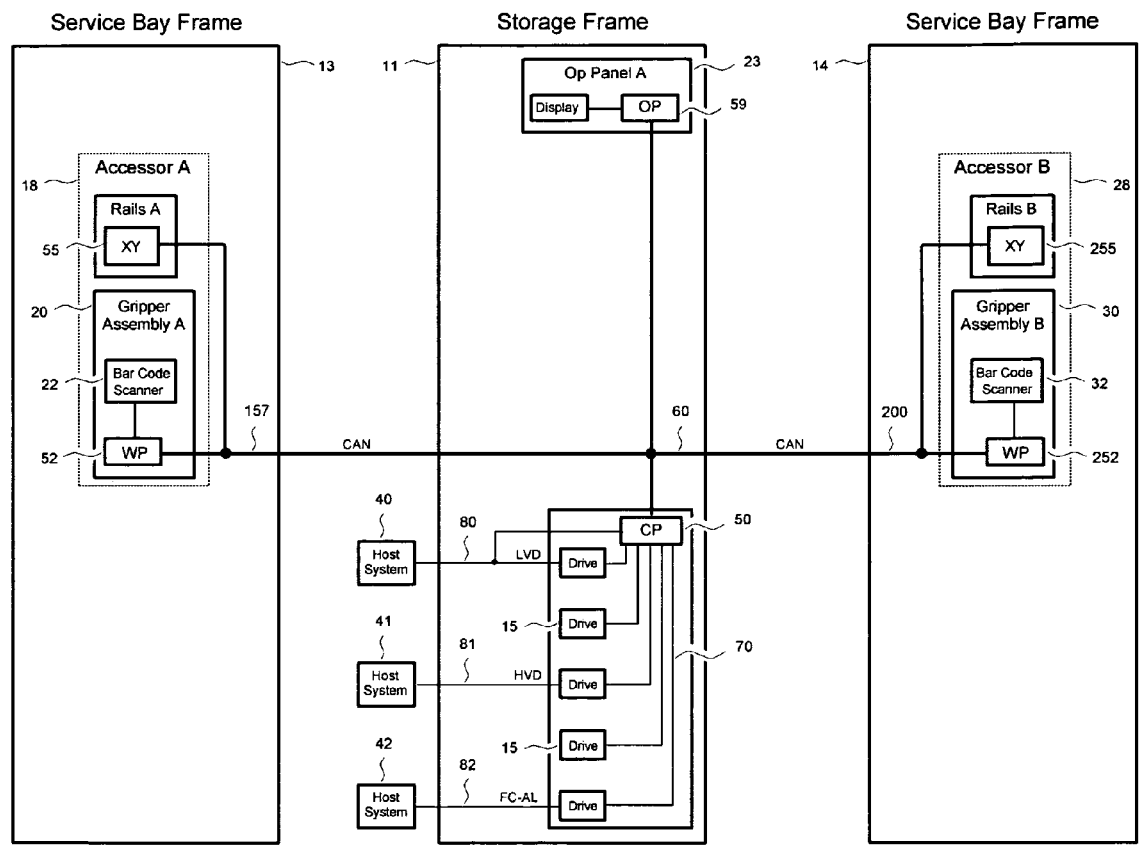
FIG. 3 is a block diagram of an automated data storage library in which the present invention may be implemented.

FIG. 3 is a block diagram of the automated data storage library 10 of FIGS. 1 and 2 which employs a distributed system of modules with a plurality of processor nodes. An example of an automated data storage library which may implement the distributed system depicted in FIG. 3, and which may implement the present invention, is the IBM 3584 UltraScalable Tape Library. For a fuller understanding of a distributed control system incorporated in an automated data storage library, refer to U.S. Pat. No. 6,356,803, which is entitled "Automated Data Storage Library Distributed Control System," which is incorporated herein by reference.

While the automated data storage library 10 has been described as employing a distributed control system, the present invention may be implemented in automated data storage libraries regardless of control configuration, such as, but not limited to, an automated data storage library having one or more library controllers that are not distributed, as that term is defined in U.S. Pat. No. 6,356,803. The library of FIG. 3 comprises one or more storage frames 11, a left hand service bay 13 and a right hand service bay 14. The left hand service bay 13 is shown with a first accessor 18. As discussed above, the first accessor 18 comprises a gripper assembly 20 and may include a reading system 22 to "read" identifying information about the data storage media. The right hand service bay 14 is shown with a second accessor 28. The second accessor 28 comprises a gripper assembly 30 and may include a reading system 32 to "read" identifying information about the data storage media. In the event of a failure or other unavailability of the first accessor 18, or its gripper 20, etc., the second accessor 28 may perform some or all of the functions of the first accessor 18. The two accessors 18, 28 may share one or more mechanical paths or they may comprise completely independent mechanical paths. In one example, the accessors 18, 28 may share a common horizontal rail and have independent vertical rails. The first accessor 18 and the second accessor 28 are described as first and second for descriptive purposes only and this description is not meant to limit either accessor to an association with either the left hand service bay 13, or the right hand service bay 14.

In the library 10 illustrated as an example in FIG. 3, the first and second accessors 18 and 28 move their grippers in at least two directions, called the horizontal "X" direction and vertical "Y" direction, to retrieve and grip, or to deliver and release the cartridges, at the storage cells 16 and to load and unload the cartridges at the data storage drives 15.

The library 10 receives commands from one or more host systems 40, 41 or 42. The host systems, such as host servers, communicate with the library directly, e.g., on path 80, through one or more control ports (not shown), or through one or more data storage drives 15 on paths 81, 82, providing commands to access particular data storage media and move the media, for example, between the storage cells 16 and the data storage drives 15. The commands are typically logical commands identifying the media and/or logical locations for accessing the media. The terms "commands" and "work requests" are used interchangeably herein to refer to such communications from the host system 40, 41 or 42 to the library 10 as are intended to result in accessing particular data storage media within the library 10.

The library 10 is controlled by a distributed control system receiving the logical commands from hosts, determining the required actions, and converting the actions to physical movements of first accessor 18 and/or second accessor 28.

In the library 10, the distributed control system comprises a plurality of processor nodes, each having one or more processors. In one example of a distributed control system, a communication processor node 50 may be located in a storage frame 11. The communication processor node provides a communication link for receiving the host commands, either directly or through the drives 15, via at least one external interface, e.g., coupled to line 80.

The communication processor node 50 may additionally provide a communication link 70 for communicating with the data storage drives 15. The communication processor node 50 may be located in the frame 11, close to the data storage drives 15. Additionally, in an example of a distributed processor system, one or more additional work processor nodes are provided, which may comprise, e.g., a work processor node 52 that may be located at first accessor 18, and that is coupled to the communication processor node 50 via a network 60, 157. Each work processor node may respond to received commands that are broadcast to the work processor nodes from any communication processor node, and the work processor nodes may also direct the operation of the accessors, providing move commands. An XY processor node 55 may be provided and may be located at an XY system of first accessor 18. The XY processor node 55 is coupled to the network 60, 157, and is responsive to the move commands, operating the XY system to position the gripper 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network, for example comprising a common bus 60, is provided, coupling the various processor nodes. The network may comprise a robust wiring network, such as the commercially available CAN (Controller Area Network) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

The communication processor node 50 is coupled to each of the data storage drives 15 of a storage frame 11, via lines 70, communicating with the drives 15 and with host systems 40, 41 and 42. Alternatively, the host systems 40, 41 and 42 may be directly coupled to the communication processor node 50, at input 80 for example, or to control port devices (not shown) which connect the library 10 to the host system(s) with a library interface similar to the drive/library interface. As is known to those of skill in the art, various communication arrangements may be employed for communication with the hosts 40, 41 and 42 and with the data storage drives 15. In the example of FIG. 3, host connections 80 and 81 are SCSI busses. Bus 82 comprises an example of a Fibre Channel bus which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70. Alternatively, the data storage drives 15 may be coupled to the communication processor node 50 through one or more networks, such as a common bus network.

Additional storage frames 11 may be provided and each is coupled to the adjacent storage frame. Any of the storage frames 11 may comprise communication processor nodes 50, storage shelves 16, data storage drives 15, and networks 60.

Further, as described above, the automated data storage library 10 may comprise a plurality of accessors. The second accessor 28, for example, is shown in a right hand service bay 14 of FIG. 3. The second accessor 28 may comprise a gripper 30 for accessing the data storage cartridges, and an XY processor node 255 may be provided and may be located at an XY system of the second accessor 28. The second accessor 28 may run on the same horizontal mechanical path as first accessor 18 or on an adjacent path. The control system additionally may also comprise an extension network 200 forming a network coupled to network 60 of the storage frame(s) 11 and to the network 157 of left hand service bay 13.

In FIG. 3 and the accompanying description, the first and second accessors are associated with the left hand service bay 13 and the right hand service bay 14 respectively. This is for illustrative purposes and there may not be an actual association. In addition, the network 157 may not be associated with the left hand service bay 13 and the network 200 may not be associated with the right hand service bay 14. Depending on the design of the library and the particular needs of the customer, it may not be necessary to have a left hand service bay 13 and/or a right hand service bay 14.

An automated data storage library 10 typically comprises one or more controllers to direct the operation of the automated data storage library. Host computers and data storage drives typically comprise similar controllers. A controller may take many different forms and may comprise, for example but not be limited to, an embedded system, a distributed control system, a personal computer, or a workstation, etc. Alternatively, one of the processor nodes 50, 52, 55, 59, 252, 255 may comprise a controller. In such a configuration, one of the processor nodes comprises the controller while any other processor nodes may work under the direction of the controller. Still further, two or more of the processor nodes 50, 52, 55, 59, 252, 255 may comprise a controller. In this further configuration, two or more processor nodes comprise the controller while any other processor nodes may work under the direction of the controller. Essentially, the term "controller" as used herein is intended in its broadest sense as a device or system that contains at least one processor, as such term is defined herein.

Figure 4:
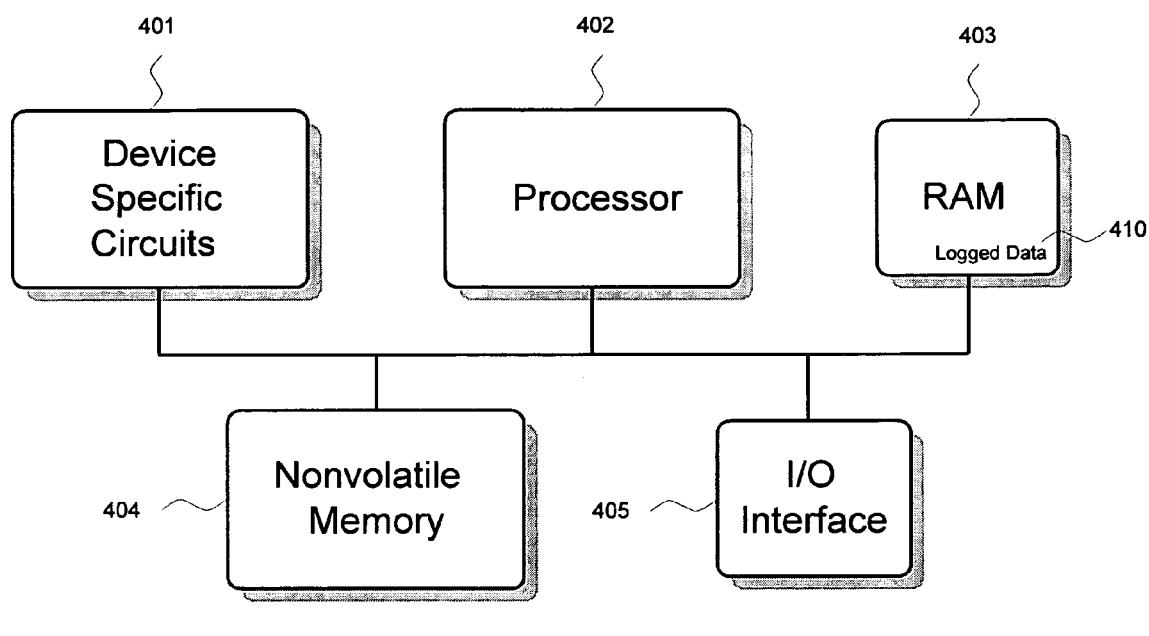
FIG. 4 is a block diagram depicting one configuration of a controller.

FIG. 4 shows a typical controller 400 with a processor 402, RAM (Random Access Memory) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, FPGA (Field Programmable Gate Array), ASIC (Application Specific Integrated Circuit), discrete logic, or the like. The RAM (Random Access Memory) 403 is typically used to hold variable data, stack data, executable instructions, and the like. The nonvolatile memory 404 may comprise any type of nonvolatile memory such as, but not limited to, EEPROM (Electrically Erasable Programmable Read Only Memory), flash PROM (Programmable Read Only Memory), battery backup RAM, and hard disk drives. The nonvolatile memory 404 is typically used to hold the executable firmware and any nonvolatile data. The I/O interface 405 comprises a communication interface that allows the processor 402 to communicate with devices external to the controller. Examples may comprise, but are not limited to, serial interfaces such as RS-232, USB (Universal Serial Bus), Fibre Channel, SCSI (Small Computer Systems Interface), CAN (Controller Area Network), etc. The device specific circuits 401 provide additional hardware to enable the controller 400 to perform unique functions such as, but not limited to, motor control of a cartridge gripper. The device specific circuits 401 may comprise electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

The library 10 includes numerous mechanical components, such as, but not limited to, movement of the accessor 18, action of the gripper 20, receipt into and ejection from cartridges by a drive loader, motion of the tape across read/write heads in a drive, positioning of the heads as they seek a specific data track of a multi-track media, motion of the heads as they maintain alignment with a data track while reading/writing, etc. Control of these mechanical components is accomplished using servo control loops whose algorithms may be executed in device specific circuits 401, in the processor 402 and/or in circuitry within the mechanical components.

Figure 5:
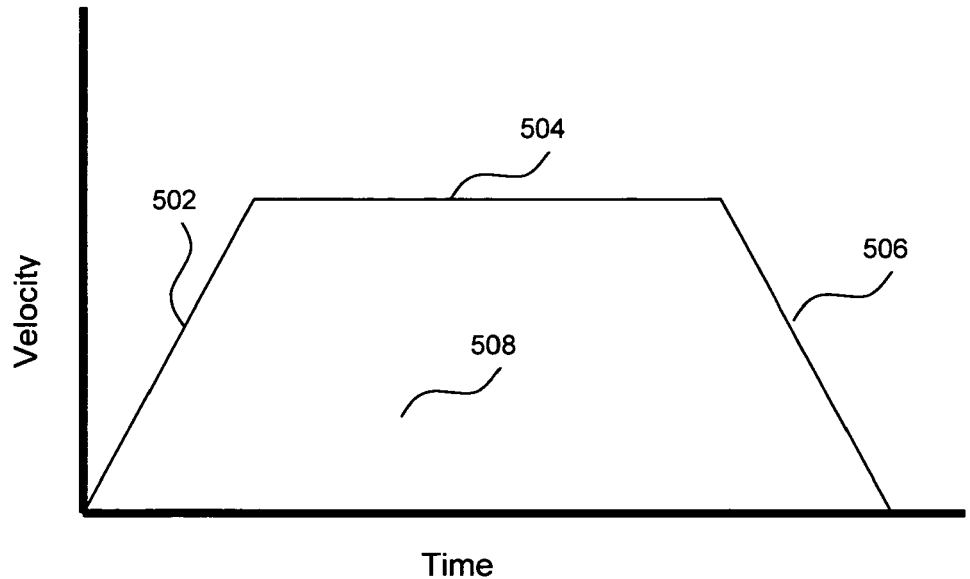
FIG. 5 is a plot of a velocity profile for controlling a mechanical system, such as a gripper in a tape library system.

FIG. 5 illustrates a velocity profile for controlling a mechanical system. When moving a mechanical system from one position for another, a velocity profile is typically used, created such that the move will not cause excessive stress on the mechanical hardware being moved or performing the move. A simple velocity profile could consist of an acceleration portion 502, a constant velocity portion 504 and a deceleration portion 506. This velocity profile is such that the area 508 under the velocity curve 502, 504, 506 is the distance to be traveled. The desired position of the mechanical system an any point in time can be found by integrating the velocity profile from the start time of the move to the point in time of interest, and adding that to the position of the mechanical system at the beginning of the move.

Figure 6:
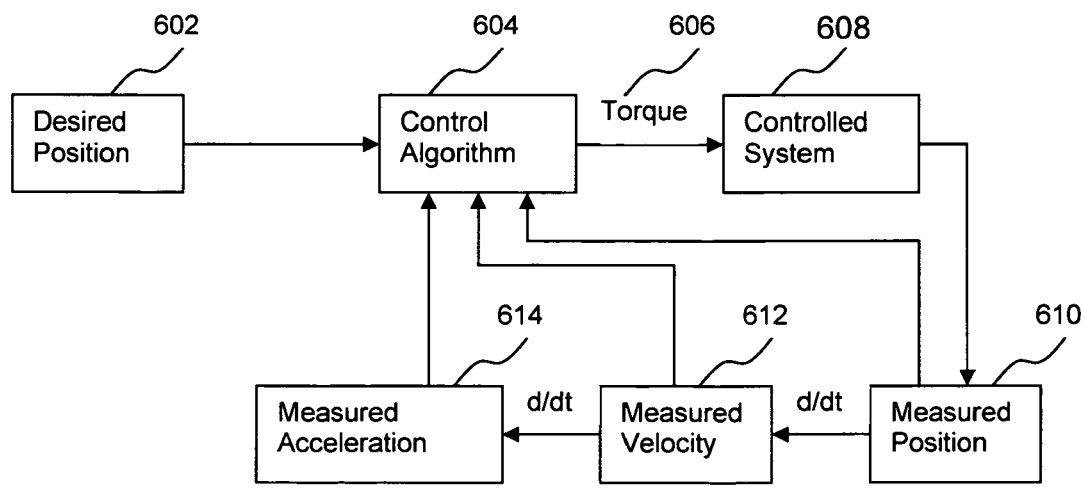
FIG. 6 is a block diagram of an example of a servo control loop to which the present invention may be applied.

FIG. 6 shows a block diagram of a servo control loop for controlling the position of a mechanical system. The desired position 602 is typically obtained by integrating a velocity profile, similar to the one shown in FIG. 5. The control algorithm uses the desired position 602, the measured position 610, the measured velocity 612 and/or the measured acceleration 614 to compute the torque 606 that should be applied to a controlled system, such as the motor of the mechanical system, to cause the mechanical system to move to the desired position. The measured position 610, velocity 612 and acceleration 614 of the controlled system may be measured individually. Alternatively, as shown in the figure, the acceleration and velocity may be derived by taking the derivative of the measured position. The desired position 602, the torque 606, the measured position 610, the measured velocity 612 and the measured acceleration 614 are often parameters of interest that are recorded in a servo log.

Continuing the example, in order to move the accessor 18 from one location to another, a motion profile is selected or generated based upon the current location of the accessor 18, how far it is to travel to its target destination, how fast it is to travel and what acceleration and deceleration is appropriate. Parameters of the servo algorithm used to control the accessor motor may include, therefore, desired and actual positions, desired and actual velocities, acceleration and motor torque. In a prior art data logging system, these parameters would be monitored and their values recorded in fields of consecutive log entries at regular intervals as the motor moves the accessor according to the motion profile. Thus, in the event of a failure, the progress of the accessor 18 may be recreated from the recorded parameter values which represent a sequence of states of the motor.

The size of a field of the log entries may vary depending upon the particular parameter being recorded. For example, the actual and desired motor positions may each be stored in a 16-bit field, the actual and desired velocities may each be stored in a 22-bit field and the torque may be stored in a 9-bit field (an 8-bit value and a 1-bit sign). Therefore each log entry could require 85 bits, or 63 bits if the desired velocity is not recorded.

The present invention, however, provides a system and method for logging such data in less space based upon the recognition that the values of some of the parameters may not change by a large amount from one recorded entry to the next and the recognition that at least some of the changes may be predicted from the acceleration and/or velocity profiles of the hardware being controlled. Thus, by storing absolute values of parameters from the beginning of a move and/or at intervals during the move and storing relative values between the absolute values, the amount of space required by the entries may be significantly reduced without the loss of any information. The absolute values may be recorded at regular, periodic intervals. Alternatively, or in addition, an updated absolute value may be recorded if the relative value of a parameter, that is, the change from the previous value, is greater than can be stored in an relative entry. For example, assume that the desired and actual positions of a motor are being recorded and that each requires 32-bits if stored as an absolute value, for a total of 8 bytes of logged data per entry. When the motor moves less than 128 counts per servo interval, the relative position only requires 8 bits, a substantial savings in memory space. And, if the motor moves faster than 128 counts per interval, a full absolute value may be recorded. Thus, more logged data 410 (FIG. 4) may be stored in the same amount of memory 403. Although the logged data is shown as being stored in RAM 403, the logged data may also be stored in non-volatile memory 404 or may be sent over the I/O interface 405 to another controller or to a monitoring system.

It should be noted that the term "absolute value" is used herein not in the mathematical sense (that is, the value of a number without regard to its sign) but rather used to refer to the full, uncompressed value of a parameter, as opposed to a value which is relative.

Whether an absolute value of a parameter is stored in a log entry or a relative value is stored, the then-current complete value is first obtained from whatever device is used to monitor the parameter. If an absolute value is to be stored, that complete value is used. If, however, a relative value is to be stored, the difference between the complete value and the previous complete value is determined and that difference is stored as the relative entry. Thus, the difference will be small relative to the full value. During later analysis of logged data, the complete value of a particular parameter at a particular entry (representing a point in time) may be obtained by finding the most recently logged absolute value and adding the values of all relative entries for that parameter (that is, the sequence of differences) between the absolute entry and the desired relative entry.

FIG. 7 illustrates one example of a data structure for storing absolute parameter values, in this case in fields for the absolute position, the absolute desired velocity, the absolute actual velocity and the absolute torque. The parameters filling the data structures and entries described herein are chosen as representative examples and are not to be construed as a limitation. It will be appreciated that other parameters, fewer parameters (even a single parameter) or more parameters may be recorded in an actual logging system. The data structure of FIG. 7 also includes a field for the entry type, as will be explained below. The sizes of the fields holding absolute values should be chosen to be large enough to store all expected or possible values for that field. For example, if the absolute position will always be between −1,000,000 and 1,000,000, then 21 bits would be required to store all possible absolute positions.

The sizes of the fields holding relative values should be chosen to be large enough to store common expected changes of each parameter and small enough to provide a significant reduction in the memory required to store the logged data. The amount of change in the position during a particular move may be estimated from the velocity profile of the motion and the amount of change in velocity may be estimated from the acceleration profile. Changes in other parameter values may be similarly estimated. Moreover, field size selection entails a tradeoff. Larger-sized fields are able to accommodate a wider range of parameter value changes but at the cost of requiring more memory. On the other hand, smaller-sized fields may require the more frequent recording of absolute values when changes are large but may be a more efficient scheme if the value changes by only a small amount most of the time. For more convenient memory management, a full log entry may be expanded to an integer number of bytes, with some bit spaces remaining unused or used for overhead, such as to indicate the entry type.

FIG. 8 illustrates one example of a data structure for storing relative parameter values, in this case in fields for the relative position, the relative desired velocity, the relative actual velocity and the absolute torque. Again, the particular fields in FIG. 8 are illustrative only. In some servo applications, the torque changes so rapidly that recording relative values does not provide significant space savings. Therefore, the data structure illustrated in FIG. 8 allows updated absolute values to be recorded. FIG. 9 illustrates a shorter version of a data structure for storing relative parameter values, with the field for the relative desired velocity having been removed since the value it may not change very frequently. Use of the data structure shown in FIG. 9 may imply that the desired velocity has not changed.

The present invention preferably includes a data structure defining an informational entry. FIG. 10 illustrates an example of such a data structure. The data structure includes fields for storing the number of bits of each field of subsequent relative value data entries. In the illustration, a 4-bit field specifies the number of bits of the relative position field, another 4-bit field specifies the number of bits of the relative desired velocity field and a final 4-bit field specifies the number of bits of the relative actual velocity. Allocating zero bits to a relative value indicates that when that relative entry is used, the particular parameter is not changing, such as, for example, when the position is being held constant or when the motor is moving at a constant velocity. If/when the parameter changes, an absolute value entry may be used.

In one embodiment, multiple levels or degrees of relative may be implemented. In the example of FIG. 11, two levels are illustrated in the data structure. It will be appreciated that the two illustrated levels are merely representative and that more levels (or a single level) may also be used. For example, a relative entry of level 1 may use a 4-bit field to store the relative value of a parameter as long as the value changes by less than 8 units. If the value changes by more than 8 units but less than 128, the value will be stored in an 8-bit field at a relative level 2. And, if the value changes by more than 128 units, the value may be stored in an updated absolute entry.

Further compression may be achieved when the value of an actual parameter is near the value of the corresponding desired parameter, such when the actual position is closely tracking the desired position. Instead of storing the desired position and associated relative values of the actual position, the desired position and the position error may be recorded and stored. In later analysis, the actual position may be derived from these values.

Because the data log has limited size, even when the system and methods of the present invention are implemented, it will eventually become full and the earliest stored data will be overwritten to make room for more recent logged data. However, if data is overwritten in the conventional manner, information may be lost unnecessarily when an absolute entry is overwritten and later-recorded associated relative entries remain: the "stranded" relative entries will no longer have a point of reference and can no longer be "decoded". Similarly, if relative entries have variable field lengths, overwriting of an informational entry also leads to stranded associated relative entries and the loss of information. The stranded associated relative entries may be considered invalid. Storing periodic absolute and/or informational entries, even when there is no change in the size of relative entry fields, can reduce, but not necessarily eliminate, the loss. Storing absolute and/or informational entries at the end of each move as well as at the beginning, with associated relative entries sandwiched between the two, may also reduce information loss. Alternatively, storing the absolute and/or informational entries before and after the associated relative entries eliminates stranded relative entries and reduces both memory usage and information loss. Relative entries are then decoded by the earliest subsequent absolute and/or informational entry.

It is important to note that while the present invention has been described in the context of a fully functioning data processing system, those of ordinary skill in the art will appreciate that the processes of the present invention are capable of being distributed in the form of a computer readable storage medium of instructions and a variety of forms and that the present invention applies regardless of the particular type of signal bearing media actually used to carry out the distribution. Examples of computer readable storage media include recordable-type media such as a floppy disk, a hard disk drive, a RAM, and CD-ROMs.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for logging motion-related data obtained from a system or a method for deploying computing infrastructure comprising integrating computer readable code into a computing system for doing so.

What is claimed is:

1. A method for logging motion-related data obtained from a system, comprising:
   providing a memory space;
   obtaining an initial complete value of a motion-related parameter of an initial physical state of a system;
   saving the initial complete value as an initial absolute value in a first field of a first absolute log entry in the memory space, the first field having a first length;
   periodically obtaining a first group of additional complete values of the parameter with the system in a then current state;
   determining the difference between each additional complete value and the preceding complete value; and
   saving each difference as a relative value in a first field of a respective relative log entry in the memory space, the first field of the relative log entry having a second length shorter than the first length.

2. The method of claim 1, further comprising:
   periodically obtaining an updated complete value of the parameter with the system;
   saving the updated complete value as an updated absolute value in the first field of a new absolute log entry in the memory space;
   periodically obtaining a second group of additional complete values of the parameter with the system in a then current state;
   determining the difference between each additional complete value and the preceding complete value; and
   saving each difference as a relative value in the first field of a respective relative log entry in the memory space.

3. The method of claim 1, further comprising:
   if a periodic relative value is longer than the second length, obtaining an updated complete value of the parameter with the system; and
   saving the updated complete value as an updated absolute value in the first field of a new absolute log entry in the memory space.

4. The method of claim 1, further comprising saving a first value representing the second length in a first field of an initial informational log entry prior to obtaining the relative values.

5. The method of claim 4, further comprising:
   periodically saving a second value representing a new second length in a first field of a second initial informational log entry;
   obtaining an updated complete value of the parameter;
   saving the updated complete value as an updated absolute value in the first field of a new absolute log entry in the memory space;
   periodically obtaining a new group of additional complete values of the parameter;
   determining the difference between each additional complete value and the preceding complete value; and
   saving each difference as a relative value in the first field of a respective relative log entry in the memory space.

6. The method of claim 4, further comprising:
   saving a value representing a second length of the field of the relative log entry in a second field of the informational log;
   saving a relative value in a field of a respective relative log entry in the memory space, the field having the first length if the relative value has a length less than or equals to the first length;
   saving a relative value in a field of a respective relative log entry in the memory space, the field having the second length if the relative value has a length greater than the first length and less than or equal to the second length; and
   saving an updated complete value in a field of an updated absolute log entry in the memory space if the relative value has a length greater than the second length.

7. The method of claim 1, wherein the second length of a relative log entry is zero if an obtained complete value is unchanged from an immediately preceding complete value.

8. The method of claim 1, wherein the system is a magnetic tape data storage system and the motion-related parameter is a servo control parameter.

9. A method for logging servo data obtained from a servo-controlled system, comprising:
   providing a memory space;
   obtaining an initial complete value of each of a plurality servo parameters representative of an initial physical state of a servo-controlled system;
   saving the initial complete values as absolute values in a corresponding plurality of fields of a first absolute log entry in the memory space, each field having a respective first length;
   periodically obtaining a first group of additional complete values of at least one of the plurality of parameters;
   determining the difference between each additional complete value and the preceding complete value;
   saving each difference as a relative value in a corresponding field of a periodic relative log entry in the memory space, the field of the relative log entry having a first length shorter than the length of the field of the absolute log entry;
   periodically obtaining an updated complete value of each parameter;
   saving each updated complete value as an absolute value in a field of a new absolute log entry in the memory space;
   periodically obtaining a new group of additional values of the at least one parameter;
   determining the difference between each additional complete value and the preceding complete value; and
   saving each difference as a relative value in a field of a respective relative log entry in the memory space.

10. The method of claim 9, further comprising for each parameter, saving a value representing the first length of the field of the relative log entry in a first field of an informational log.

11. The method of claim 10, further comprising:
    for each parameter, saving a value representing a second length of the field of the relative log entry in a second field of the informational log;
    saving each relative value in a field of a respective relative log entry in the memory space, the field having the first length if each relative value has a length less than or equal to the first length;
    saving each relative value in a field of a respective relative log entry in the memory space, the field having the second length if each relative value has a length greater than the first length and less than or equal to the second length; and
    saving an updated complete value in a field of an updated absolute log entry in the memory space if at least one relative value has a length greater than the second length.

12. A system for logging servo data from a servo-controlled system, comprising:
    a memory;
    a data structure of a first type having a first length;

a data structure of a second type having a second length less than the first length;

a servo loop to control a first parameter of a mechanical subsystem of the servo-controlled system according to a selected servo profile defining a sequence of first parameter values;

means for obtaining a first complete value of the first parameter and a first group of associated periodic complete values of the first parameter;

a first servo log entry comprising a data structure of the first type in which the first complete value of the first parameter is stored as a first absolute value;

means for determining the difference between each associated periodic complete value of the first group and the preceding complete value; and a plurality of second servo log entries, each comprising a data structure of the second type in which the differences are stored as a first group of relative values.

13. The system of claim 12, wherein:
the means for obtaining values of the first parameter further comprise:
  means for obtaining an updated complete value; and
  means for obtaining a second group of periodic complete values associated with the second absolute value; and
the system further comprises:
  an updated servo log entry, comprising a data structure of the first type, in which the updated complete value of the first parameter is stored as an updated absolute value;
  means for determining the difference between each associated periodic complete value of the second group and the preceding complete value; and
  a plurality of third servo log entries, each comprising a data structure of the second type, in which the differences are stored as a second group of relative values.

14. The system of claim 13, further comprising:
a first informational log entry associated with the first absolute log entry indicating the length of the data structure of the second type in which the first group of relative values is stored; and
a second informational log entry associated with the second absolute log entry indicating the length of the data structure of the second type in which the second group of relative values is stored.

15. The system of claim 12, wherein:
the means for obtaining values of the parameter comprise:
  means for obtaining an updated complete value of the first parameter if a periodic relative value is longer than the second length; and
  means for obtaining a second group of periodic complete values of the first parameter associated with the updated complete value; and
the system further comprises:
  an updated servo log entry, comprising a data structure of the first type, in which the updated complete value of the first parameter is stored as an updated absolute value;
  determining the difference between each complete value of the second group and the preceding complete value; and
  a plurality of third servo log entries, each comprising a data structure of the second type, in which each difference of the second group is stored as a second group of periodic relative values.

16. The system of claim 12, wherein the second length of a data structure of the second type is zero if an obtained complete value of the first parameter to be stored therein is unchanged from an immediately preceding complete value of the first parameter.

17. The system of claim 12, wherein:
the servo loop further controls a second parameter of the mechanical subsystem according to the selected servo profile;
the data structure of the first type comprises a first field of the first length and a second field;
the data structure of the second type comprises a first field of the second length and a second field;
an absolute value of the first parameter is stored in the first field of the first servo log entry of the first type and an absolute value of the second parameter is stored in the second field of the first servo log entry type; and
a relative value of the first parameter is stored in the first field of the first servo log entry of the second type and an absolute value of the second parameter is stored in the second field of the first servo log entry of the second type.

18. The system of claim 12, further comprising a third data structure type for storing a value representing the second length.

19. The system of claim 12, wherein the system is a magnetic tape data storage system.

20. A computer program product of a computer readable storage medium usable with a programmable computer, the computer program product having computer-readable code embodied therein for logging mechanical-based parameters from a system, the computer-readable code comprising instructions for:
providing a memory space;
obtaining an initial complete value of a motion-related parameter of an initial physical state of a system;
saving the initial complete value as an initial absolute value in a first field of a first absolute log entry in the memory space, the first field having a first length;
periodically obtaining a first group of additional complete values of the parameter with the system in a then current state;
determining the difference between each additional complete value and the preceding complete value; and
saving each difference as a relative value in a first field of a respective relative log entry in the memory space, the first field of the relative log entry having a second length shorter than the first length.

21. The computer program product of claim 20, the computer-readable code further comprising instructions for:
periodically obtaining an updated complete value of the parameter with the system;
saving the updated complete value as an updated absolute value in the first field of a new absolute log entry in the memory space;
periodically obtaining a second group of additional complete values of the parameter with the system in a then current state;
determining the difference between each additional complete value and the preceding complete value; and
saving each difference as a relative value in the first field of a respective relative log entry in the memory space.

22. The computer program product of claim 20, the computer-readable code further comprising instructions for:
if a periodic relative value is longer than the second length, obtaining an updated absolute value of the parameter with the system; and
saving the updated absolute value in the first field of a new absolute log entry in the memory space.

23. The computer program product of claim 20, the computer-readable code further comprising instructions for saving a first value representing the second length in a first field of an initial informational log entry prior to obtaining the relative values.

24. The computer program product of claim 23, the computer-readable code further comprising instructions for:
periodically saving a second value representing a new second length in a first field of a second initial informational log entry;
obtaining an updated complete value of the parameter;
saving the updated complete value as an updated absolute value in the first field of a new absolute log entry in the memory space;
periodically obtaining a new group of additional complete values of the parameter;
determining the difference between each additional complete value and the preceding complete value; and
saving each difference as a relative value in the first field of a respective relative log entry in the memory space.

25. The computer program product of claim 23, the computer-readable code further comprising instructions for:
saving a value representing a second length of the field of the relative log entry in a second field of the informational log;
saving a relative value in a field of a respective relative log entry in the memory space, the field having the first length if the relative value has a length less than or equal to the first length;
saving a relative value in a field of a respective relative log entry in the memory space, the field having the second length if the relative value has a length greater than the first length and less than or equal to the second length; and
saving an updated complete value in a field of an updated absolute log entry in the memory space if the relative value has a length greater than the second length.

26. The computer program product of claim 20, wherein the second length of a relative log entry is zero if an obtained complete value is unchanged from an immediately preceding complete value.

27. The computer program product of claim 20, wherein the system is a magnetic tape data storage system and the motion-related parameter is a servo control parameter.

28. A method for deploying computing infrastructure, comprising integrating computer readable code into a computing system, wherein the code, in combination with the computing system, is capable of performing the following:
providing a memory space;
obtaining an initial complete value of a motion-related parameter of an initial physical state of a system;
saving the initial complete value as an initial absolute value in a first field of a first absolute log entry in the memory space, the first field having a first length;
periodically obtaining a first group of additional complete values of the parameter with the system in a then current state;
determining the difference between each additional complete value and the preceding complete value; and
saving each difference as a relative value in a first field of a respective relative log entry in the memory space, the first field of the relative log entry having a second length shorter than the first length.

29. The method of claim 28, wherein the code is further capable of performing the following:
periodically obtaining an updated complete value of the parameter with the system;
saving the updated complete value as an updated absolute value in the first field of a new absolute log entry in the memory space;
periodically obtaining a second group of additional complete values of the parameter with the system in a then current state;
determining the difference between each additional complete value and the preceding complete value; and
saving each difference as a relative value in the first field of a respective relative log entry in the memory space.

30. The method of claim 28, wherein the code is further capable of performing the following:
if a periodic relative value is longer than the second length, obtaining an updated absolute value of the parameter with the system; and
saving the updated absolute value in the first field of a new absolute log entry in the memory space.

31. The method of claim 28, wherein the code is further capable of performing the following:
saving a first value representing the second length in a first field of an initial informational log entry prior to obtaining the relative values.

32. The method of claim 31, wherein the code is further capable of performing the following:
periodically saving a second value representing a new second length in a first field of a second initial informational log entry;
obtaining an updated complete value of the parameter;
saving the updated complete value as an updated absolute value in the first field of a new absolute log entry in the memory space;
periodically obtaining a new group of additional complete values of the parameter;
determining the difference between each additional complete value and the preceding complete value; and
saving each difference as a relative value in the first field of a respective relative log entry in the memory space.

33. The method of claim 31, wherein the code is further capable of performing the following:
saving a value representing a second length of the field of the relative log entry in a second field of the informational log;
saving a relative value in a field of a respective relative log entry in the memory space, the field having the first length if the relative value has a length less than or equals to the first length;
saving a relative value in a field of a respective relative log entry in the memory space, the field having the second length if the relative value has a length greater than the first length and less than or equal to the second length; and
saving an updated complete value in a field of an updated absolute log entry in the memory space if the relative value has a length greater than the second length.

34. The method of claim 28, wherein the second length of a relative log entry is zero if an obtained complete value is unchanged from an immediately preceding complete value.

35. The method of claim 28, wherein the system is a magnetic tape data storage system and the motion-related parameter is a servo control parameter.

* * * * *